United States Patent Office 2,909,561
Patented Oct. 20, 1959

2,909,561

N-SUBSTITUTED UREA AND CARBAMATE DERIVATIVES OF WATER-INSOLUBLE TERTIARY AMINES

Ernest Merian, Bottmingen, and Bruno J. R. Nicolaus, Basel, Switzerland, assignors to Sandoz A.G., Basel, Switzerland, a Swiss firm No Drawing. Application July 12, 1957
Serial No. 671,409

Claims priority, application Switzerland July 18, 1956

7 Claims. (Cl. 260—472)

The present invention relates to a process for the production of new water-insoluble tertiary amines of the general formula:

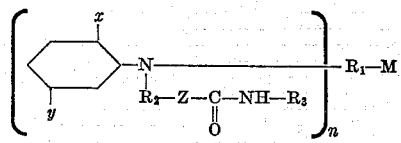
(I)

wherein $x$ denotes hydrogen, halogen or a low molecular alkyl or alkoxy radical, $y$ hydrogen, halogen, a low molecular alkyl or alkoxy radical or the trifluoromethyl or trifluoroacetyl radical or an alkanoylamino radical with not more than 18 carbon atoms, $n$ the number 1 or 2, $R_1$ an alkylene radical with 1 to 4 carbon atoms, $R_2$ an alkylene radical with 2 to 4 carbon atoms, $R_3$ an aliphatic, cycloaliphatic or aromatic radical which is free from sulfur and may contain further substituents, Z oxygen or the imino group, and M hydrogen, halogen, the methoxy, ethoxy, cyano, difluoromethyl, trifluoromethyl or carbalkoxy radical, or

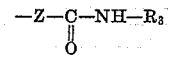

in which $R_3$ and Z possess the aforementioned meanings, when $n$ has the value 1, or a single carbon-nitrogen linkage, when $n$ has the value 2.

Especially valuable water-insoluble tertiary amines are those which correspond to the Formula I wherein $n$ and Z have the aforenamed meanings and $x$ denotes hydrogen or a low molecular alkyl or alkoxy radical, $y$ denotes hydrogen or a low molecular alkyl or alkoxy group, $R_1$ denotes a methylene or ethylene radical, $R_2$ denotes an ethylene or 2-methylethylene radical, $R_3$ denotes a low molecular alkyl radical, the cyclohexyl radical or a phenyl radical which may bear nonionic substituents, and M denotes hydrogen, halogen, the cyano, the trifluoromethyl or a —Z—CO—NH—$R_3$ group, in which Z and $R_3$ have the above stated significances, when $n$ has the value 1, and the single carbon-nitrogen linkage, when $n$ has the value 2.

Throughout the specification the terms "lower alkyl" and "lower alkoxy" stand for "alkyl" and "alkoxy" respectively "containing 1 to 6 carbon atoms."

The process for the production of the water-insoluble tertiary amines consists in reacting 1 mol of a compound of the formula

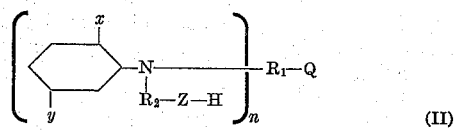
(II)

wherein $x$, $y$, $n$, Z, $R_1$ and $R_2$ have the meanings recited in the foregoing, Q stands for hydrogen, halogen, the hydroxy, amino, methoxy, ethoxy, difluoromethyl or trifluoromethyl, carbalkoxy or cyano group, when $n$ has the value 1, and for a single carbon-nitrogen linkage, when $n$ has the value 2, with 1 or 2 moles of an isocyanate of the formula $$O=C=N-R_3 \quad (III)$$

wherein $R_3$ has one of the above-stated meanings.

The reaction of the compounds of Formula II with the isocyanates is carried out advantageously in solution (e.g. in an indifferent organic solvent) or, when liquid or liquefied components are employed, by direct mixing. The reaction temperature may vary within wide limits in accordance with the operating procedure that is adopted. The new products are isolated by one of the common basic operations, e.g. filtration, evaporation of the solvent or precipitation from the solvent with a suitable agent.

The new compounds are valuable intermediate products which find employment in the manufacture of dyestuffs and pharmaceutical products. Thus, upon coupling the initially mentioned tertiary amines of Formula I with diazo compounds, which latter may contain further substituents commonly used in azo dyestuffs but are free from water-solubilizing groups, one arrives at water-insoluble azo dyestuffs having the formula

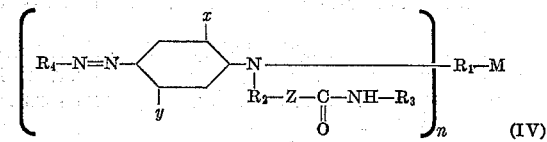
(IV)

wherein $x$, $y$, $R_1$, $R_2$, $R_3$, M, Z and $n$ possess the aforenamed meanings and $R_4$ stands for a mono- or bicyclic aromatic or heterocyclic radical which may be further substituted by substituents commonly used in azo dyestuffs with the exception of water-solubilizing groups.

Alternatively, an aldehyde group can be introduced into the compounds of Formula I in the para-position to the tertiary amino group, using the known methods. These aldehydes can be condensed with compounds containing active methylene groups to give styryl dyestuffs which correspond to the formula:

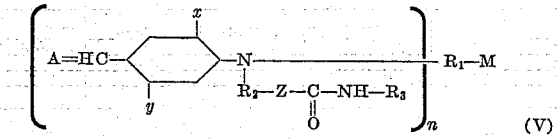
(V)

wherein $x$, $y$, $n$, $R_1$, $R_2$, $R_3$, M and Z have the initially mentioned meanings and A denotes the radical of an open chain or cyclic compound containing active methylene groups, which radical is condensed on the active methylene group and may contain further substituents except water-solubilizing groups, e.g. the radical of malonic acid dinitrile or that of a cyanoacetic acid ester, a benzenesulfoacetonitrile or 1.3.3-trimethyl-2-methyleneindoline.

The water-insoluble azo and styryl dyestuffs obtained thus are suitable for dyeing cellulose ester fibers from aqueous dispersion and in the spinning solution. They have similar suitability for dyeing synthetic polyamide, polyvinyl and terephthalic acid ester fibers, on which they give dyeings characterized by excellent fastness properties.

In the examples which follow the parts and percentages are by weight; the temperatures are in degrees centigrade and the melting points are uncorrected.

EXAMPLE 1

89.5 parts of 1-(N-ethyl-N-$\beta$-hydroxyethyl)-amino-3-methylbenzene, 100 parts of dry benzene and 43 parts of ethylisocyanate are mixed and boiled with reflux. After some time the mixture is concentrated by evaporation and then distilled in a high vacuum. At a pressure of 0.03 mm. and 130–132° the ethylcarbaminic acid ester of the 1-(N-ethyl-N-$\beta$-hydroxyethyl)-amino-3-methylbenzene distils over. It has a melting point at 50° and is obtained in a good yield.

EXAMPLE 2

89.5 parts of 1-(N-ethyl-N-$\beta$-hydroxyethyl)-amino-3-methylbenzene and 72 parts of phenylisocyanate are mixed and gently heated. After some time the reaction is completed and the congealed product is re-crystallized from benzene or ethyl alcohol. A good yield of the phenylcarbaminic acid ester of the 1-(N-ethyl-N-$\beta$-hydroxyethyl)-amino-3-methylbenzene is obtained. Its melting point is 88–90°.

EXAMPLE 3

184 parts of 1-(N-$\beta$-cyanoethyl-N-$\beta$-hydroxyethyl)-amino-3-methylbenzene, 200 parts of benzene and 84 parts of ethylisocyanate are boiled for 48 hours with reflux, after which the benzene is distilled off at 70° in vacuo. The wax-like residue which remains is the ethylcarbaminic acid ester of the 1-(N-$\beta$-cyanoethyl-N-$\beta$-hydroxyethyl)-amino-3-methylbenzene, which melts at about 95°.

In Table I below valuable tertiary amines are enumerated which can be produced by the process described in the foregoing. They correspond to the general formula

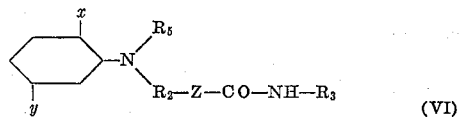

(VI)

The meanings of $x$, $y$, $R_5$, $R_2$, $R_3$ and $Z$ are given in columns I to VI respectively. Column VII contains the melting points of the new compounds and column VIII the shade in acetone solution of the coupling products with 4-nitrobenzene-1-diazonium chloride.

and are characterized by the symbols $y$ and $R_3$ columns I and II and by the shade in acetone solution of the coupling products with 4-nitrobenzene-1-diazonium chloride (column III).

Table 2

| Ex. No. | (I) $y$ | (II) $R_3$ | (III) |
|---|---|---|---|
| 8 | Methyl | Ethyl | Orange. |
| 9 | Ethyl | do | Do. |
| 10 | Methoxy | do | Do. |
| 11 | Ethoxy | do | Do. |
| 12 | Trifluoromethyl | do | Yellow-orange. |
| 13 | Chlorine | do | Do. |
| 14 | Bromine | do | Do. |
| 15 | Acetylamino | do | Scarlet-red. |
| 16 | Trifluoro-acetylamino | do | Scarlet. |
| 17 | Methyl | Methyl | Orange. |
| 18 | do | n-Propyl | Do. |
| 19 | do | n-Butyl | Do. |
| 20 | Hydrogen | do | Yellow-orange. |
| 21 | Ethyl | do | Orange. |
| 22 | Methoxy | do | Do. |
| 23 | Ethoxy | do | Do. |
| 24 | Trifluoromethyl | do | Yellow-orange. |
| 25 | Chlorine | do | Do. |
| 26 | Bromine | do | Do. |
| 27 | Acetylamino | do | Scarlet-red. |
| 28 | Trifluoro-acetylamino | do | Scarlet. |
| 29 | Hydrogen | Cyclohexyl | Yellow-orange. |
| 30 | Methyl | do | Orange. |
| 31 | Methoxy | do | Do. |
| 32 | Ethoxy | do | Do. |
| 33 | Trifluoromethyl | do | Yellow-orange. |
| 34 | Chlorine | do | Do. |
| 35 | Bromine | do | Do. |
| 36 | Acetylamino | do | Scarlet-red. |
| 37 | Trifluoro-acetylamino | do | Scarlet. |
| 38 | Ethyl | Phenyl | Orange. |
| 39 | Ethoxy | do | Do. |
| 40 | Trifluoromethyl | do | Yellow-orange. |
| 41 | Chlorine | do | Do. |
| 42 | Bromine | do | Do. |
| 43 | Acetylamino | do | Scarlet-red. |
| 44 | Trifluoro-acetylamino | do | Scarlet. |
| 45 | Hydrogen | 4'-methoxyphenyl | Yellow-orange. |
| 46 | do | 4'-ethylphenyl | Do. |
| 47 | do | 4'-tert.butylphenyl | Do. |
| 48 | do | 3'-methylphenyl | Do. |
| 49 | do | 3'-methoxyphenyl | Do. |
| 50 | do | 2'.4'-dimethylphenyl | Do. |
| 51 | Methyl | 2.5'-dimethylphenyl | Orange. |
| 52 | do | 2'-methylphenyl | Do. |
| 53 | do | 2'-methoxyphenyl | Do. |
| 54 | do | 4'-isopropylphenyl | Do. |
| 55 | do | 4'-tert.-amylphenyl | Do. |
| 56 | do | 3'-methylphenyl | Do. |
| 57 | do | 4'-methylphenyl | Do. |
| 58 | Ethyl | do | Do. |
| 59 | Methoxy | do | Do. |
| 60 | Ethoxy | do | Do. |
| 61 | Chlorine | do | Yellow-orange. |
| 62 | Bromine | do | Do. |
| 63 | Trifluoromethyl | do | Do. |
| 64 | Trifluor-acetylamino | do | Scarlet. |
| 65 | Acetylamino | do | Scarlet-red. |

In Table 3 further valuable water-insoluble tertiary amines are described. They correspond to the formula

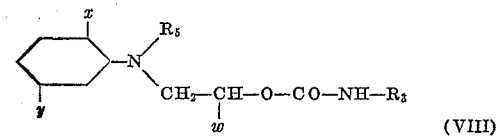

(VIII)

| Ex. No. | (I) $x$ | (II) $y$ | (III) $R_5$ | (IV) $R_2$ | (V) $R_3$ | (VI) $Z$ | (VII) M.P. | (VIII) |
|---|---|---|---|---|---|---|---|---|
| 4 | H | Methyl | Cyanoethyl | Ethylene | Ethyl | Oxygen | 98 | Scarlet-red. |
| 5 | H | do | do | do | phenyl | do | 110 | Scarlet. |
| 6 | H | H | ethyl | do | do | do | 97 | Orange. |
| 7 | H | Methyl | do | do | do | Imino | 130 | Scarlet. |

Table 2 contains further valuable tertiary amines which can be produced according to the present process. They have the general formula

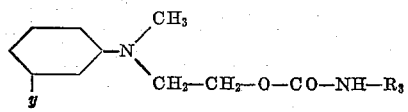

(VII)

and are characterized by the symbols $x$, $y$, $w$, $R_5$ and $R_3$ in columns I to V and by the shade in acetone solution of the coupling products with 4-nitrobenzene-1-diazonium chloride in column VI.

Table 3

| Ex. No. | (I) x | (II) y | (III) w | (IV) R₅ | (V) R₃ | (VI) |
|---|---|---|---|---|---|---|
| 66 | Hydrogen | Hydrogen | Hydrogen | Ethyl | Phenyl | Yellow-orange. |
| 67 | Chlorine | do | do | do | do | Yellow. |
| 68 | Bromine | do | do | do | do | Do. |
| 69 | Methyl | do | do | do | do | Orange. |
| 70 | Ethyl | do | do | do | do | Do. |
| 71 | Isopropyl | do | do | do | do | Do. |
| 72 | Methoxy | do | do | do | do | Do. |
| 73 | Ethoxy | do | do | do | do | Do. |
| 74 | Chlorine | Methyl | do | do | do | Do. |
| 75 | Bromine | do | do | do | do | Do. |
| 76 | Methyl | do | do | do | do | Red. |
| 77 | Ethyl | do | do | do | do | Do. |
| 78 | Isopropyl | do | do | do | do | Do. |
| 79 | Methoxy | do | do | do | do | Do. |
| 80 | Ethoxy | do | do | do | do | Do. |
| 81 | Methyl | Methoxy | do | do | do | Do. |
| 82 | do | Methyl | do | n-Propyl | do | Do. |
| 83 | do | do | do | n-Butyl | do | Do. |
| 84 | Hydrogen | do | do | 2′.2′.2′-trifluoroethyl | do | Orange-red. |
| 85 | do | Hydrogen | do | do | do | Orange. |
| 86 | do | do | do | n-Propyl | do | Orange-red. |
| 87 | do | do | do | n-Butyl | do | Do. |
| 88 | do | do | do | 2′-chloroethyl | do | Orange. |
| 89 | do | do | do | 2′-bromoethyl | do | Do. |
| 90 | do | do | do | 2′-methoxyethyl | do | Red. |
| 91 | do | do | do | 2′-ethoxyethyl | do | Do. |
| 92 | do | do | do | 2′,2′-difluoroethyl | do | Orange. |
| 93 | do | do | do | 2′.2′.2′-trifluoroethyl | do | Do. |
| 94 | do | do | do | 2′-cyanoethyl | do | Do. |
| 95 | do | do | do | (2′-carbomethoxy)-ethyl | do | Do. |
| 96 | do | do | do | (2′-carbethoxy)-ethyl | do | Do. |
| 97 | do | Methyl | do | 2′-chloroethyl | do | Orange-red. |
| 98 | do | do | do | 2′-bromoethyl | do | Do. |
| 99 | do | do | do | 2′-methoxyethyl | do | Red. |
| 100 | do | do | do | 2′-ethoxyethyl | do | Do. |
| 101 | do | do | do | 2′-cyanoethyl | do | Scarlet-red. |
| 102 | do | do | do | 2′.2′-difluoroethyl | do | Scarlet. |
| 103 | do | do | do | 2′.2′.2′-trifluoroethyl | do | Orange-red. |
| 104 | do | do | do | (2′-carbomethoxy)-ethyl | do | Do. |
| 105 | do | do | Methyl | Ethyl | do | Red. |
| 106 | do | do | do | do | 4′-methylphenyl | Do. |
| 107 | do | do | do | do | n-Butyl | Do. |
| 108 | do | do | do | do | Ethyl | Do. |
| 109 | do | Hydrogen | do | do | do | Orange-red. |
| 110 | do | do | do | do | n-Butyl | Do. |
| 111 | do | do | do | (2′-carbomethoxy)-ethyl | 4′-methylphenyl | Do. |
| 112 | do | do | do | do | Phenyl | Scarlet. |
| 113 | Methyl | Methyl | do | do | do | Red. |
| 114 | do | Methoxy | do | do | do | Do. |

Table 4 contains some water-insoluble tertiary amines of the general formula

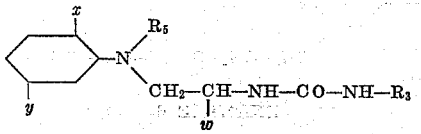

They are characterized by the symbols, x, y, w, R₅ and R₃ in columns I to V and by the shade of the acetone solution of the coupling products with 4-nitrobenzene-1-diazonium chloride in column VI.

In the following Table 5 are listed a few tertiary amines of the formula

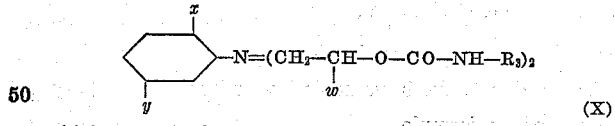

(X)

which are obtainable by the process described in Examples 1 to 3. They are characterized by the symbols x, y, w and R₃ in columns I to IV and by the shade in acetone solution of the coupling products with 4-nitrobenzene-1-diazonium chloride in column V.

Table 4

| Ex. No. | (I) x | (II) y | (III) w | (IV) R₅ | (V) R₃ | (VI) |
|---|---|---|---|---|---|---|
| 115 | Hydrogen | Hydrogen | Hydrogen | Ethyl | Ethyl | Scarlet. |
| 116 | do | do | do | do | n-Butyl | Do. |
| 117 | do | do | do | do | 4′-methylphenyl | Do. |
| 118 | do | do | do | do | Phenyl | Do. |
| 119 | do | Methyl | do | do | Ethyl | Red. |
| 120 | do | do | do | do | n-Butyl | Do. |
| 121 | do | do | do | do | 4′-methylphenyl | Do. |
| 122 | do | do | do | do | Phenyl | Do. |
| 123 | Methyl | Hydrogen | do | do | do | Do. |
| 124 | Hydrogen | do | Methyl | do | do | Scarlet. |
| 125 | do | Methyl | do | do | do | Red. |

Table 5

| Ex. No. | (I) x | (II) y | (III) w | (IV) R₃ | (V) |
|---|---|---|---|---|---|
| 126 | Hydrogen | Hydrogen | Hydrogen | Phenyl | Scarlet. |
| 127 | do | do | do | 4'-methylphenyl | Do. |
| 128 | do | Methyl | do | Phenyl | Do. |
| 129 | Methyl | do | do | do | Do. |
| 130 | do | Methoxy | do | do | Do. |
| 131 | do | Methyl | Methyl | do | Scarlet-red. |
| 132 | Hydrogen | do | do | do | Scarlet. |
| 133 | do | Hydrogen | do | do | Orange. |
| 134 | do | do | do | Ethyl | Do. |
| 135 | do | do | do | n-Butyl | Do. |
| 136 | do | do | do | 4'-methylphenyl | Do. |
| 137 | do | Methyl | do | Ethyl | Orange-red. |
| 138 | do | do | do | n-Butyl | Do. |
| 139 | do | do | do | 4'-methylphenyl | Do. |
| 140 | Methyl | Hydrogen | do | Phenyl | Orange. |
| 141 | do | do | Hydrogen | do | Do. |

EXAMPLE 142

150 parts of N.N'-diphenyl-N.N'-dihydroxyethyl-ethylenediamine are melted at 65°. 131 parts of phenylisocyanate are dropped into the melt with stirring. After some time the reaction is completed. An excellent yield of the phenylcarbaminic acid ester of the N.N'-diphenyl-N.N'-dihydroxyethyl-ethylenediamine is obtained. It is coupled with 2-chloro-4-methyl-sulfonylbenzene-1-diazonium chloride to give a red powder which dissolves in acetone with an orange coloration.

When the 150 parts of N.N'-diphenyl-N.N'-dihydroxyethyl-ethylenediamine specified in the previous paragraph is replaced by 164 parts of N.N'-di-(3'-methyl)-phenyl-N.N'-dihydroxyethyl-ethylenediamine, another valuable tertiary amine is obtained. In this case the product of coupling with 2-chloro-4-methylsulfonylbenzene-1-diazonium chloride is a red powder which dissolves in acetone with a red-orange coloration.

Table 6 sets forth valuable water-insoluble tertiary amines of the formula

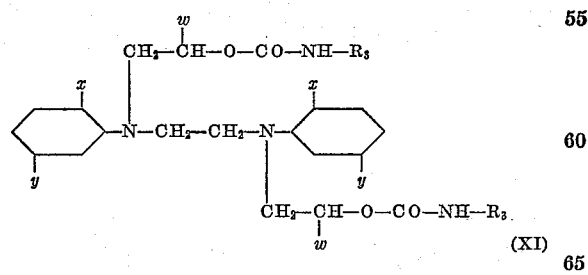

(XI)

They can be produced according to the directions given in Example 142 and are characterized by the symbols x, y, w and R₃ in columns I to IV and by the shade in acetone solution of the coupling products with 2-chloro-4-methylsulfonylbenzene-1-diazonium chloride in column V.

Table 6

| Ex. No. | (I) x | (II) y | (III) w | (IV) R₃ | (V) |
|---|---|---|---|---|---|
| 143 | Hydrogen | Hydrogen | Hydrogen | Methyl | Scarlet. |
| 144 | Methyl | do | do | Phenyl | Do. |
| 145 | Methoxy | do | do | do | Do. |
| 146 | Hydrogen | Methyl | do | do | Red. |
| 147 | do | Ethyl | do | do | Do. |
| 148 | do | Methoxy | do | do | Do. |
| 149 | do | Ethoxy | do | do | Do. |
| 150 | do | Trifluoromethyl | do | do | Orange. |
| 151 | do | Chlorine | do | do | Do. |
| 152 | do | Bromine | do | do | Do. |
| 153 | do | Acetylamino | do | do | Red. |
| 154 | do | Trifluoroacetylamino | do | do | Scarlet-red. |
| 155 | do | Hydrogen | do | Ethyl | Scarlet. |
| 156 | do | do | do | Butyl | Do. |
| 157 | do | do | do | 4-methylphenyl | Do. |
| 158 | do | Methyl | do | Ethyl | Red. |
| 159 | do | do | do | Butyl | Do. |
| 160 | do | do | Methyl | Ethyl | Do. |
| 161 | do | Hydrogen | do | Phenyl | Scarlet. |
| 162 | do | Methyl | Hydrogen | do | Red. |
| 163 | do | do | do | Butyl | Do. |
| 164 | Methyl | do | do | Phenyl | Do. |
| 165 | Methoxy | do | do | do | Do. |
| 166 | Methyl | Methoxy | do | do | Do. |
| 167 | Methoxy | do | do | do | Do. |
| 168 | Methyl | do | Methyl | do | Do. |
| 169 | Methoxy | do | do | do | Do. |
| 170 | Methyl | Methyl | do | do | Do. |
| 171 | Methoxy | do | do | do | Do. |

Formulae of representative tertiary amines of the foregoing examples are:

EXAMPLE 1

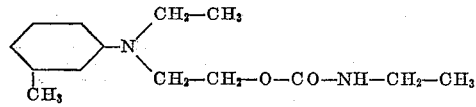

EXAMPLE 2

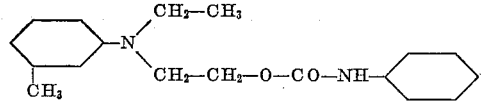

EXAMPLE 3

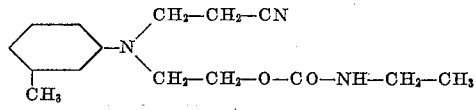

EXAMPLE 6

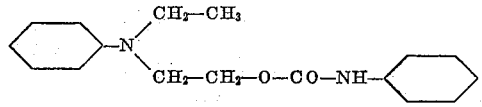

EXAMPLE 79

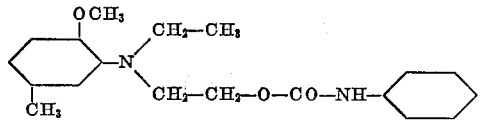

EXAMPLE 105

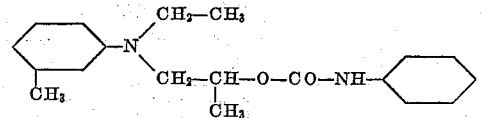

EXAMPLE 128

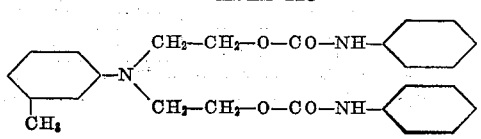

EXAMPLE 142

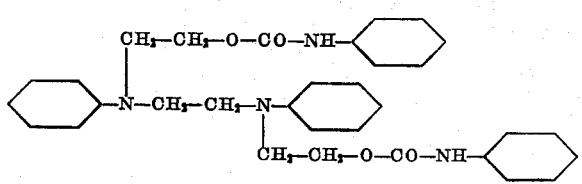

Having thus disclosed the invention what is claimed is:

1. A water-insoluble tertiary amine which corresponds to the formula

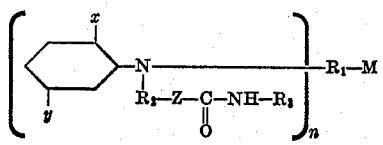

wherein x represents a member selected from the group consisting of a hydrogen atom, a halogen atom, a low molecular alkyl and a low molecular alkoxy radical, y represents a member selected from the group consisting of a hydrogen atom, a halogen atom, a low molecular alkyl radical, a low molecular alkoxy radical, the trifluoromethyl radical, the trifluoroacetyl radical and an alkanoylamino radical with not more than 18 carbon atoms, n represents one of the integers 1 and 2, $R_1$ represents an alkylene radical with 1 to 4 carbon atoms, $R_2$ represents an alkylene radical with 2 to 4 carbon atoms, $R_3$ represents a member selected from the group consisting of a low molecular alkyl radical, a cycloalkyl radical, an unsubstituted phenyl radical, an alkylphenyl radical with from 1 to 5 carbon atoms in the alkyl group, a dimethylphenyl radical and a methoxyphenyl radical, Z represents a member selected from the group consisting of an oxygen atom and an imino group, and M represents a member selected from the group consisting of a hydrogen atom, a halogen atom, a low molecular alkoxy group, the cyano group, the difluoromethyl group, the trifluoromethyl group, a carbalkoxy group and the group

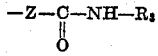

when n has the value 1, and the single carbon-nitrogen linkage, when n has the value 2.

2. A water-insoluble tertiary amine which corresponds to the formula

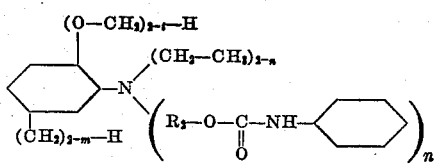

wherein $R_2$ represents an alkylene radical with 2 to 4 carbon atoms, and each of m, n, and t is one of the integers 1 and 2.

3. The water-insoluble tertiary amine which corresponds to the formula

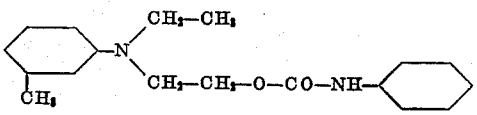

4. The water-insoluble tertiary amine which corresponds to the formula

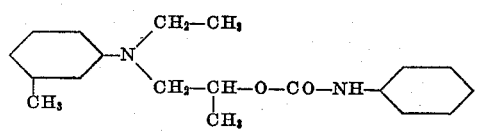

5. The water-insoluble tertiary amine which corresponds to the formula

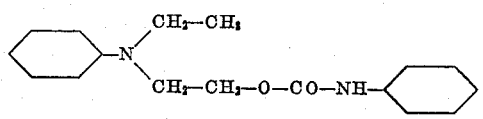

6. The water-insoluble tertiary amine which corresponds to the formula

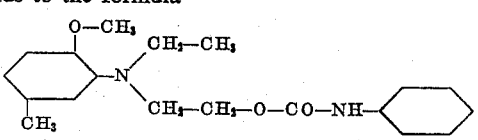

7. The water-insoluble tertiary amine which corresponds to the formula

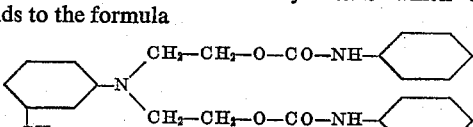
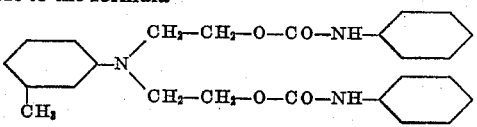

References Cited in the file of this patent

UNITED STATES PATENTS 2,109,492    Lott et al. _____ Mar. 1, 1938
2,238,486    Dickey et al. _____ Apr. 15, 1941

FOREIGN PATENTS 1,082,639    France _____ June 23, 1954